US 6,684,973 B2

(12) United States Patent
Baba et al.

(10) Patent No.: US 6,684,973 B2
(45) Date of Patent: Feb. 3, 2004

(54) OCCUPANT DETECTING APPARATUS CAPABLE OF IMPROVING DETECTION ACCURACY

(75) Inventors: Satoshi Baba, Tokyo (JP); Kazunori Jinno, Tokyo (JP); Hiroshi Oikawa, Tokyo (JP); Takashi Saito, Tokyo (JP); Naoki Saito, Tokyo (JP); Shingo Nagai, Tokyo (JP); Yoshinori Masuda, Tokyo (JP)

(73) Assignee: Honda Elesys Co., Ltd., Tochigi (JP)

( * ) Notice: Subject to any disclaimer, the term of this patent is extended or adjusted under 35 U.S.C. 154(b) by 40 days.

(21) Appl. No.: 09/962,356

(22) Filed: Sep. 26, 2001

(65) Prior Publication Data
US 2002/0038947 A1 Apr. 4, 2002

(30) Foreign Application Priority Data
Sep. 29, 2000 (JP) ............................ 2000-299047

(51) Int. Cl.⁷ .................... B60R 21/00; B60R 21/32
(52) U.S. Cl. .................... 180/273; 280/735; 701/45; 340/438; 340/562
(58) Field of Search .................... 280/735; 701/45; 180/271–273; 340/436, 438, 457.1, 561–564

(56) References Cited

U.S. PATENT DOCUMENTS

| 5,948,031 A | * | 9/1999 | Jinno et al. .................... 701/45 |
| 6,066,954 A | * | 5/2000 | Gershenfeld et al. ........ 324/671 |
| 6,253,133 B1 | * | 6/2001 | Sakai et al. .................... 701/45 |
| 6,260,879 B1 | * | 7/2001 | Stanley ........................ 280/735 |
| 6,263,271 B1 | * | 7/2001 | Oka et al. ...................... 701/45 |
| 6,275,146 B1 | * | 8/2001 | Kithil et al. ............. 340/425.5 |
| 6,310,407 B1 | * | 10/2001 | Saito et al. ................. 307/10.1 |
| 6,366,200 B1 | * | 4/2002 | Aoki ........................... 340/438 |
| 6,442,464 B2 | * | 8/2002 | Eisenmann et al. ........... 701/45 |
| 6,490,515 B1 | * | 12/2002 | Okamura et al. ............. 701/49 |
| 2001/0033074 A1 | * | 10/2001 | Aoki et al. .................. 280/735 |

FOREIGN PATENT DOCUMENTS

| JP | 9-207638 | 8/1997 |
| JP | 10-297334 | 11/1998 |
| JP | 11-78655 | 3/1999 |

* cited by examiner

Primary Examiner—Paul N. Dickson
Assistant Examiner—Ruth Ilan
(74) Attorney, Agent, or Firm—Young & Thompson

(57) ABSTRACT

In an occupant detecting apparatus for detecting an occupant seated on a passenger seat of a vehicle with an airbag for the occupant, a load sensor is provided in a bottom part of the seat. A plurality of first electric field sensors are provided in the bottom part of the seat, and a plurality of second electric field sensors are provided in a rear part of the seat. An airbag inflating permission control unit permits inflation of the airbag in accordance with output signals of the load sensor and the first and second electric field sensors.

18 Claims, 24 Drawing Sheets

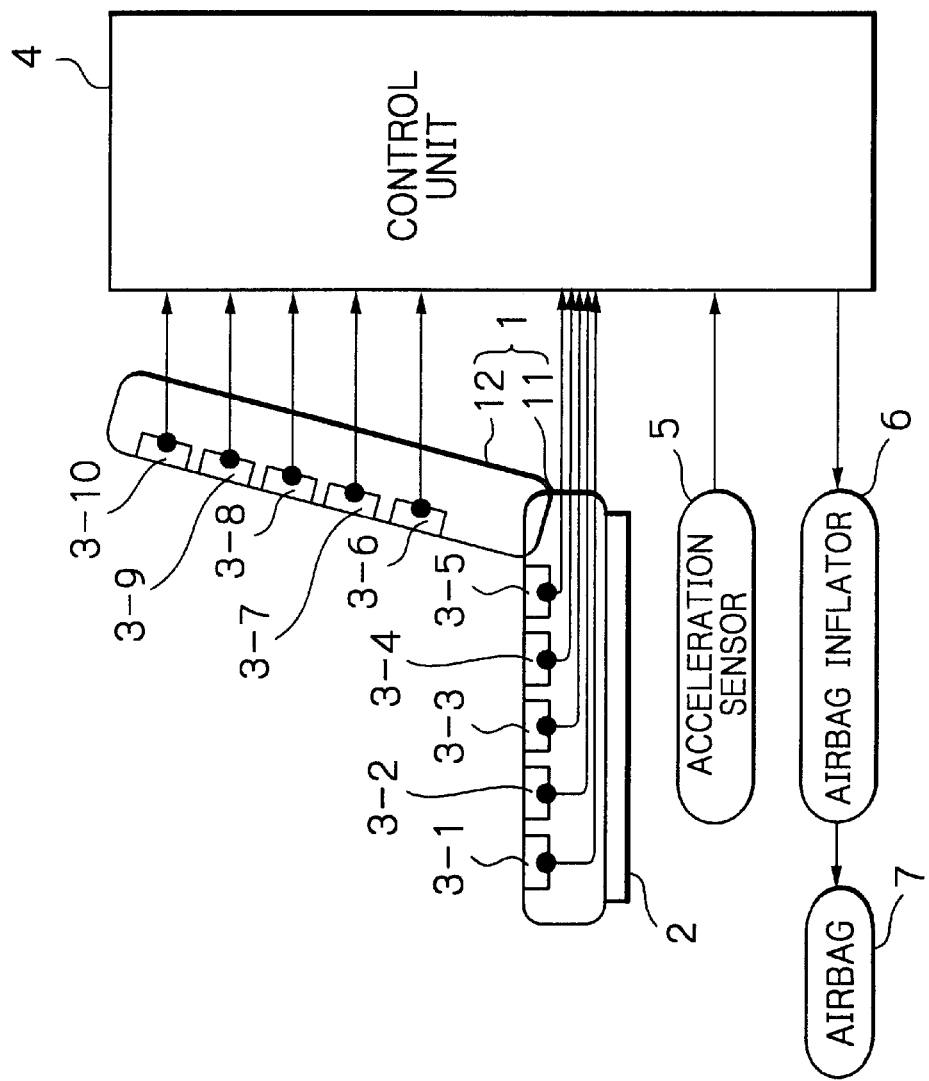

Fig. 6

| STATE | $V_{LOAD}$ | $V_{EFAV1}$ | $V_{EFAV2}$ | FX | |
|---|---|---|---|---|---|
| 1 | HIGH | HIGH | HIGH | "1" | Fig. 7A |
| 2 | HIGH | HIGH | MEDIUM | "1" | |
| 3 | HIGH | HIGH | LOW | "1" | Fig. 7B |
| 4 | HIGH | MEDIUM | HIGH | "0" | |
| 5 | HIGH | MEDIUM | MEDIUM | "0" | |
| 6 | HIGH | MEDIUM | LOW | "0" | |
| 7 | HIGH | LOW | HIGH | "0" | |
| 8 | HIGH | LOW | MEDIUM | "0" | |
| 9 | HIGH | LOW | LOW | "0" | Fig. 7C |
| 10 | MEDIUM | HIGH | HIGH | "1" | |
| 11 | MEDIUM | HIGH | MEDIUM | "1" | |
| 12 | MEDIUM | HIGH | LOW | "1" | |
| 13 | MEDIUM | MEDIUM | HIGH | "1" | Fig. 7D |
| 14 | MEDIUM | MEDIUM | MEDIUM | "0" | Fig. 7E |
| 15 | MEDIUM | MEDIUM | LOW | "0" | Fig. 7F |
| 16 | MEDIUM | LOW | HIGH | "1" | Fig. 7G |
| 17 | MEDIUM | LOW | MEDIUM | "0" | |
| 18 | MEDIUM | LOW | LOW | "0" | |
| 19 | LOW | – | – | "0" | Fig. 7H |

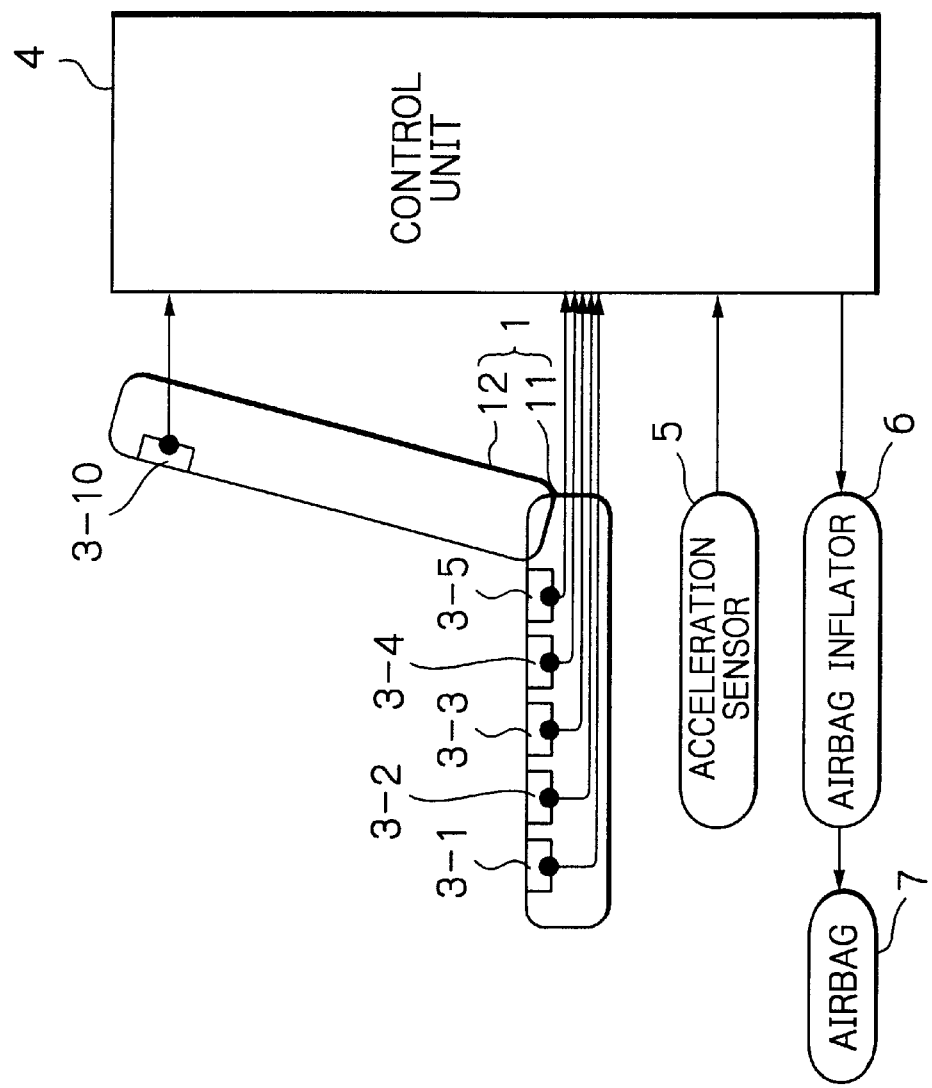

Fig. 11

| STATE | $V_{EFAV}$ | $V_{EF}(10)$ | FX | |
|---|---|---|---|---|
| 1 | HIGH | HIGH | "1" | Fig. 12A |
| 2 | HIGH | LOW | "1" | |
| 3 | MEDIUM | HIGH | "1" | Fig. 12B |
| 4 | MEDIUM | LOW | "0" | Fig. 12C |
| 5 | LOW | HIGH | "0" | |
| 6 | LOW | LOW | "0" | Fig. 12D |

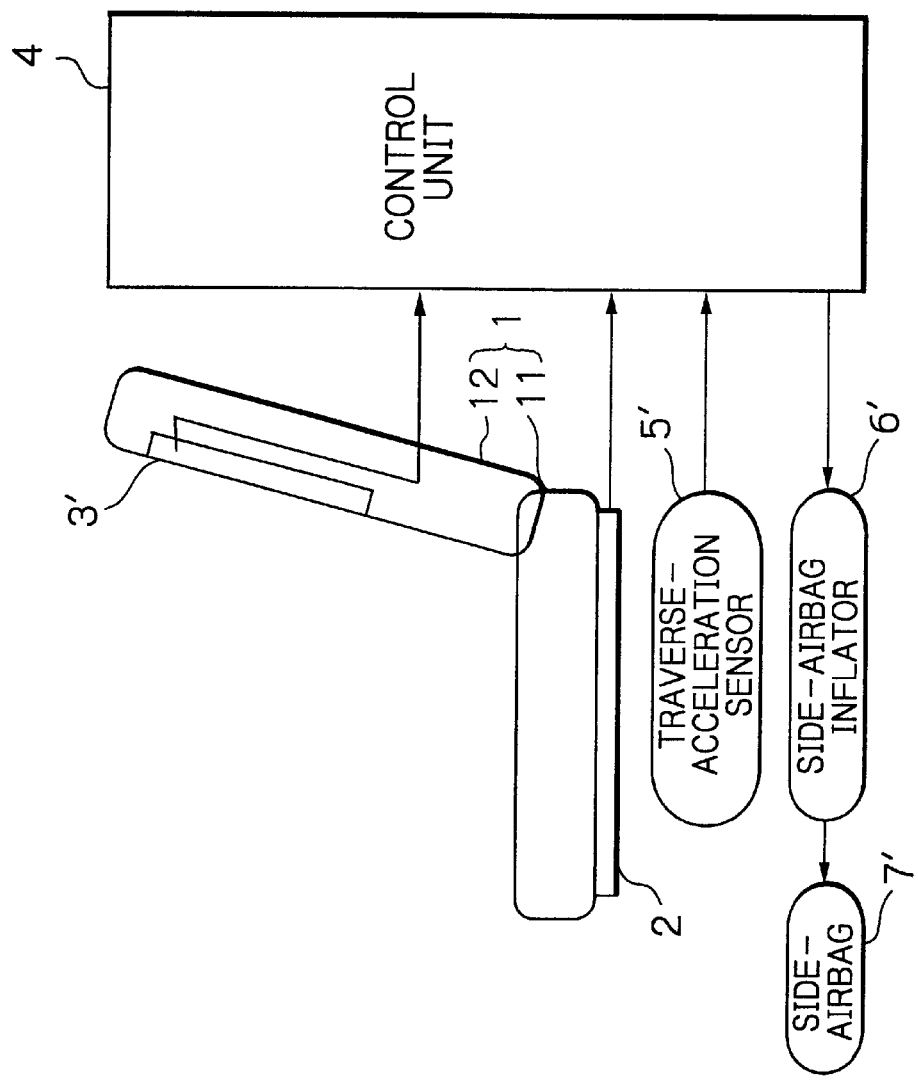

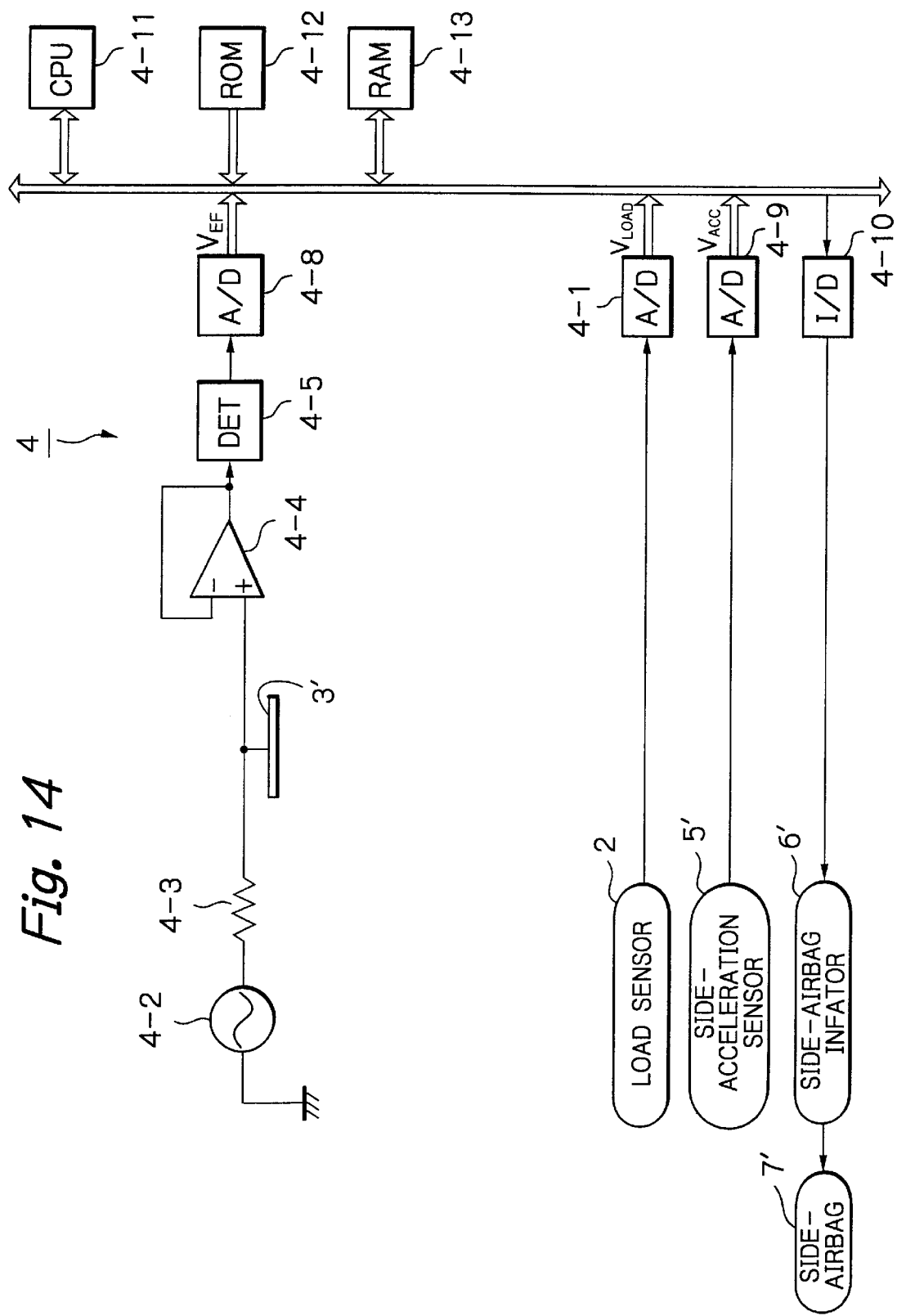

Fig. 17

| STATE | $V_{LOAD}$ | $V_{EFAV}$ | FX' | |
|---|---|---|---|---|
| 1 | HIGH | HIGH | "1" | |
| 2 | HIGH | MEDIUM | "1" | |
| 3 | HIGH | LOW | "1" | |
| 4 | MEDIUM | HIGH | "0" | Fig. 18A |
| 5 | MEDIUM | MEDIUM | "1" | Fig. 18B |
| 6 | MEDIUM | LOW | "1" | Fig. 18C |
| 7 | LOW | — | "0" | |

OCCUPANT DETECTING APPARATUS CAPABLE OF IMPROVING DETECTION ACCURACY

BACKGROUND OF THE INVENTION

1. Field of the Invention

The present invention relates to an occupant detecting apparatus for detecting an occupant seated on a passenger seat of a vehicle with an airbag.

2. Description of the Related Art

In a vehicle, an airbag is provided in a driver seat in order to alleviate the impact of a collision. Generally, since an adult is seated on the driver seat, when any occupant seated on the driver seat is detected, the inflation of the airbag is always permitted.

On the other hand, an airbag is also provided in a front passenger seat. In this case, since a child or an infant as well as an adult may be seated on the front passenger seat, the permission for the inflation of the airbag depends upon an occupant seated on the front passenger seat. Note that, when a child or an infant is seated on the front passenger seat, if the airbag is inflated, the face of the child or infant is damaged by the inflation of the airbag, which invites a more serious result. Therefore, when a child or an infant is seated on the front passenger seat, the inflation of the airbag is not permissible.

In order to determine whether an occupant seated on the front passenger seat is an adult or a child (infant), occupant detecting apparatuses have been developed. As a result, only when an occupant seated on the front passenger seat is an adult, is the inflation of the airbag permitted to protect a child (infant) from being seriously injured.

A first prior art occupant detecting apparatus is constructed by a load sensor provided on a bottom part of a front passenger seat (see: JP-A-9-207638 and JP-A-10-297334). For example, if the output voltage of the load sensor is higher than a reference value, it is determined that an adult is seat on the front passenger seat. Otherwise, it is determined that a child or an infant is seated on the front passenger seat. Note that it is possible to compare the output voltage of the load sensor with two reference values.

In the above-described first prior art occupant detecting apparatus, however, when a large luggage is seated on the front passenger seat, such a large luggage is considered as an adult to permit the inflation of the airbag. That is, it is impossible to discriminate an adult from a large luggage.

A second prior art occupant detecting apparatus is constructed by electric field sensors (see: JP-A-11-78655). This will be later explained in detail. That is, the electric field sensors can detect a human body, whether it is an adult, a child or an infant.

In the above-described second prior art occupant detecting apparatus, however, the electric field sensors detect a wet seat with no occupant as a human body to permit the inflation of the airbag.

Thus, both of the first and second prior art occupant detecting apparatuses are inferior in the detection accuracy.

SUMMARY OF THE INVENTION

It is an object of the present invention to provide an occupant detecting apparatus capable of improving the detection accuracy.

Another object is to provide an occupant detecting apparatus used in controlling the inflation of a side-airbag.

According to the present invention, in an occupant detecting apparatus for detecting an occupant seated on a passenger seat of a vehicle with an airbag for the occupant, a load sensor is provided in a bottom part of the seat. A plurality of first electric field sensors are provided in the bottom part of the seat, and a plurality of second electric field sensors are provided in a rear part of the seat. An airbag inflating permission control unit permits inflation of the airbag in accordance with output signals of the load sensor and the first and second electric field sensors.

Also, in an occupant detecting apparatus for detecting an occupant seated on a passenger seat of a vehicle with an airbag for the occupant, a plurality of first electric field sensors are provided in the bottom part of the seat, and a second electric field sensor is provided in a rear part of the seat. An airbag inflating permission control unit permits inflation of the airbag in accordance with output signals of the first and second electric field sensors.

Further, in an occupant detecting apparatus for detecting an occupant seated on a passenger seat of a vehicle with a side-airbag for the occupant, a load sensor is provided in a bottom part of the seat, and an electric field sensor is provided in a rear part of the seat on a side of the side-airbag. An airbag inflating permission control unit permits inflation of the side-airbag in accordance with output signals of the load sensor and said electric field sensor.

BRIEF DESCRIPTION OF THE DRAWINGS

The present invention will be more clearly understood from the description set forth below, as compared with the prior art, with reference to the accompanying drawings, wherein:

FIG. 2 is a diagram illustrating a first embodiment of the occupant detecting apparatus according to the present invention;

FIG. 6 is a table showing the flag calculating step of FIG. 5 in detail;

FIG. 8 is a diagram illustrating a second embodiment of the occupant detecting apparatus according to the present invention;

FIG. 11 is a table showing the flag calculating step of FIG. 10 in detail;

FIG. 13 is a diagram illustrating a third embodiment of the occupant detecting apparatus according to the present invention;

FIG. 14 is a block circuit diagram of the control unit of FIG. 13;

FIG. 17 is a table showing the flag calculating step of FIG. 16 in detail;

DESCRIPTION OF THE PREFERRED EMBODIMENTS

Before the description of the preferred embodiments, a prior art electric field sensor will be explained with reference to FIGS. 1A and 1B.

Figure 1A:
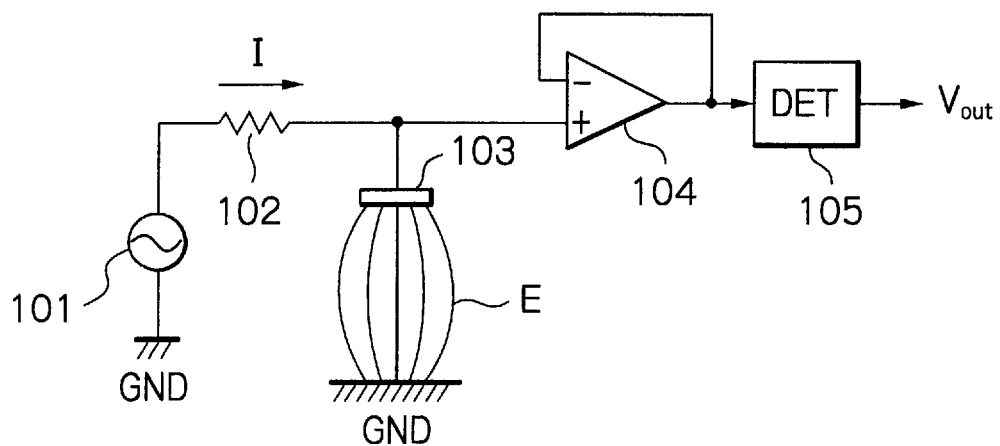
FIGS. 1A and 1B are circuit diagrams for explaining the operation of a prior art electric field sensor.

As illustrated in FIG. 1A, a high frequency oscillator 101 whose frequency is about 100 kHz is connected via a resistor 102 to an antenna electrode 103. Therefore, a differential AC electric field E is generated between the antenna electrode 103 and the ground GND, so that a load current I corresponding to the AC electric field E flows through the resistor 102. The AC load current I is converted by the resistor 102 into an AC voltage which is then transmitted by a voltage buffer 104 to a detector 105 including a bandpass filtering function which generates a DC output voltage $V_{out}$. Note that the antenna electrode 103 is mounted on an automobile seat, for example, and the ground GND indicates an automobile body.

Figure 1B:
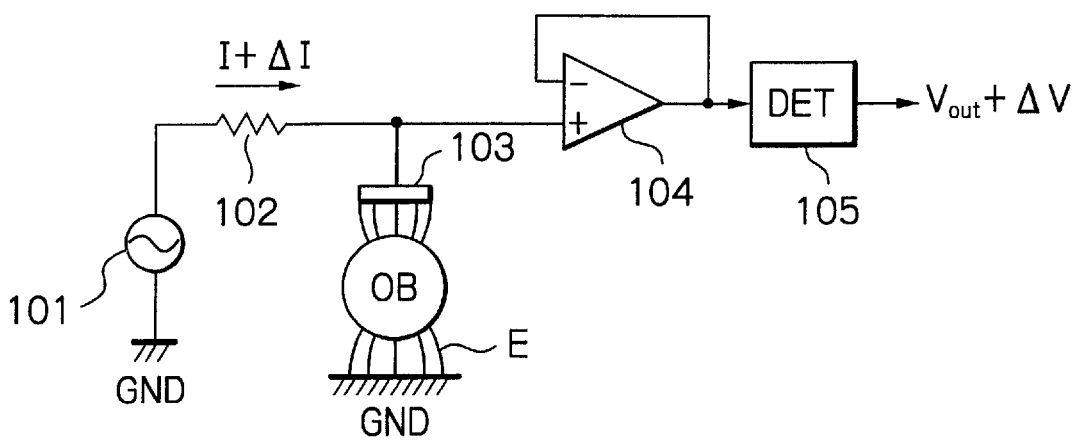

As illustrated in FIG. 1B, when an object 0B such as an occupant is seated on the seat, the current flowing between the antenna electrode 103 and the ground GND is increased by a shunting current $\Delta I$ due to the presence of the object 0B in the electric field E. As a result, the detector 105 generates a DC output voltage $V_{out}+\Delta V$ larger than the DC output voltage $V_{out}$ of FIG. 1A, thus determining whether or not the object 0B is seated on the automobile seat.

In FIG. 2, which illustrates a first embodiment of the occupant detecting apparatus according to the present invention, reference numeral 1 designates a front passenger seat formed by a bottom part 11 and a rear part 12.

A load sensor 2 formed by a strain gauge or a pressure sensor is provided between the bottom part 11 of the seat 1 and a vehicle floor (not shown), to measure the weight of an occupant seated on the seat 1.

Five antenna electrodes 3-1, 3-2, 3-3, 3-4 and 3-5 for electric field sensors are provided in the bottom part 11 of the seat 1, and five antenna electrodes 3-6, 3-7, 3-8, 3-9 and 3-10 for electric field sensors are provided in the rear part 12 of the seat 1.

The load sensor 2 and the antenna electrodes 3-1, 3-2, . . . , 3-10 are connected by a wire harness to a control unit 4 which also receives an output signal from an acceleration sensor 5 to control an airbag inflator 6 for inflating an airbag. For example, the inflator 6 includes a source of gun powder, an igniter for igniting the gun powder of the gun powder source, and a generator triggered by the ignition of the gun powder for generating pressurized hot gas. That is, when the inflator 6 is driven by the control unit 4, pressurized hot gas is injected into the airbag 7, thus rapidly inflating the airbag 7.

Figure 3:
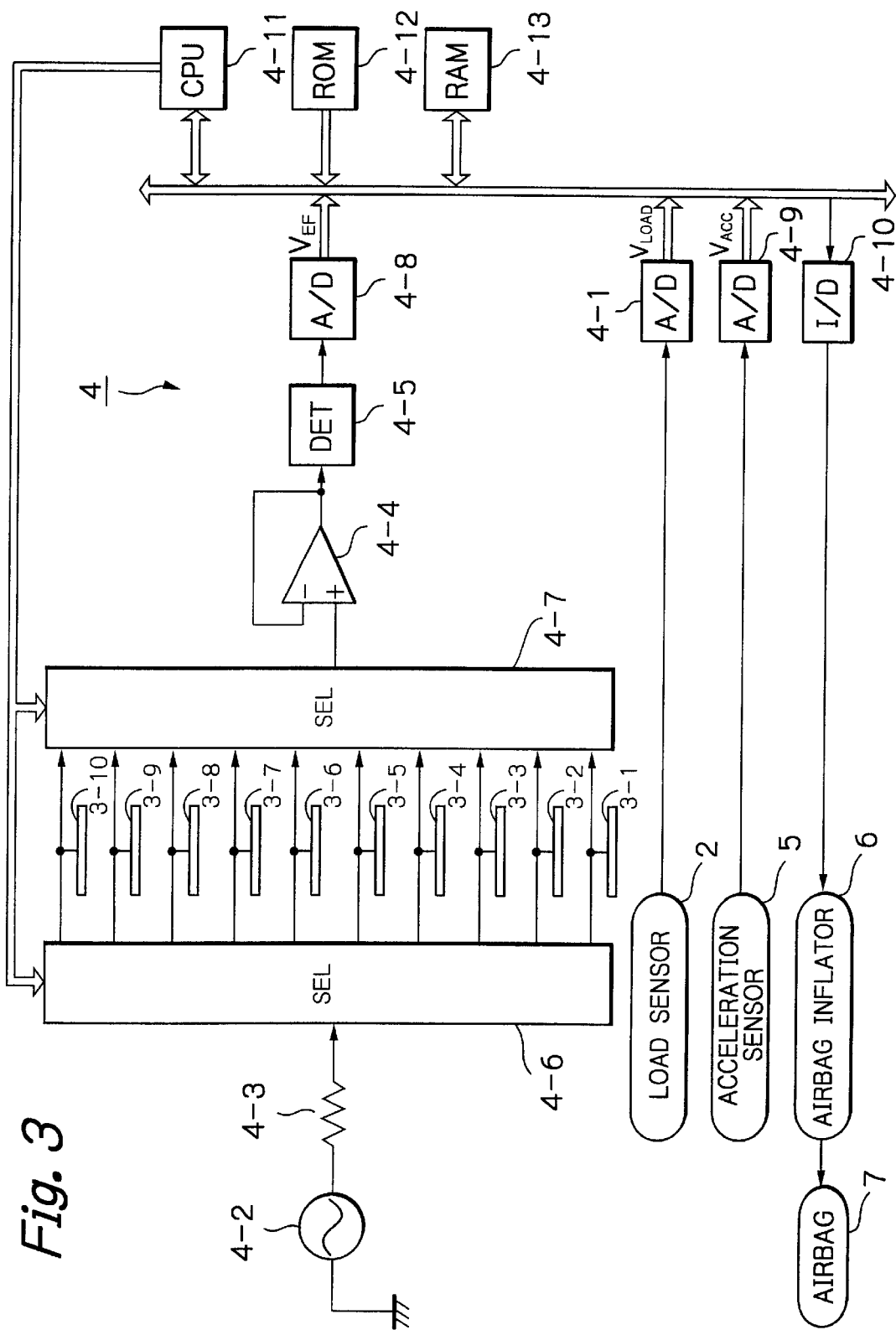
FIG. 3 is a block circuit diagram of the control unit of FIG. 4.

In FIG. 3, which is a block circuit diagram of the control unit 4 of FIG. 2, the control unit 4 is formed by an analog/digital (A/D) converter 4-1 for performing an A/D conversion upon the output signal of the load sensor 2 to generate a digital output load voltage $V_{LOAD}$ depending upon the weight of the occupant seated on the seat 1.

Also, the control unit 54 is formed by a high frequency oscillator 4-2, a resistor 4-3, a voltage buffer 4-4 and a detector 4-5 corresponding to the high frequency oscillator 101, the resistor 102, the voltage buffer 103 and the detector 104, respectively, of FIGS. 1A and 1B. One of the antenna electrodes 3-1, 3-2, . . . , 3-10 is selected by selectors 4-6 and 4-7 and is connected between the resistor 4-3 and the voltage buffer 4-4. An A/D converter 4-8 performs an A/D conversion upon an output signal of a selected electric field sensor, i.e., a selected antenna electrode to generate a digital output electric field voltage $V_{EF}$.

Further, an A/D converter 4-9 performs an A/D conversion upon the output signal of the acceleration sensor 5 to generate a digital output acceleration voltage $V_{ACC}$. An input/output interface 4-10 is connected to the airbag inflator 6.

The A/D converters 4-1, 4-8 and 4-9 and the input/output interface 4-10 are connected to a central processing unit (CPU) 4-11 for controlling the entire system, a read-only memory (ROM) 4-12 for storing programs and fixed data and a random access memory (RAM) for storing temporary data. The CPU 411 is also connected to the selectors 4-6 and 4-7.

The airbag inflating operation of the control unit 4 (the CPU 4-11) of FIG. 3 is explained next with reference to a flowchart of FIG. 4 which is carried out at predetermined time intervals.

First, at step 401, the CPU 4-11 fetches the digital output acceleration voltage $V_{ACC}$ from the A/D converter 4-9.

Next, at step 402, it is determined whether the digital output acceleration voltage $V_{ACC}$ is higher than a reference vale $V_{ACCREF}$, i.e., whether or not a collision has occurred on the front or rear side of the vehicle. Only when $V_{ACC}>V_{ACCREF}$) does the control proceed to step 403. Otherwise, the control proceeds directly to step 405.

At step 403, it is determined whether an airbag inflating permission flag FX is "1" or "0". Note that the setting and resetting of the inflation permission flag FX will be explained later. Only when FX is "1", does the control proceed to step 404 which drives the airbag inflator 6, thus inflating the airbag 7. Otherwise, the control proceeds directly to step 405.

Figure 4:
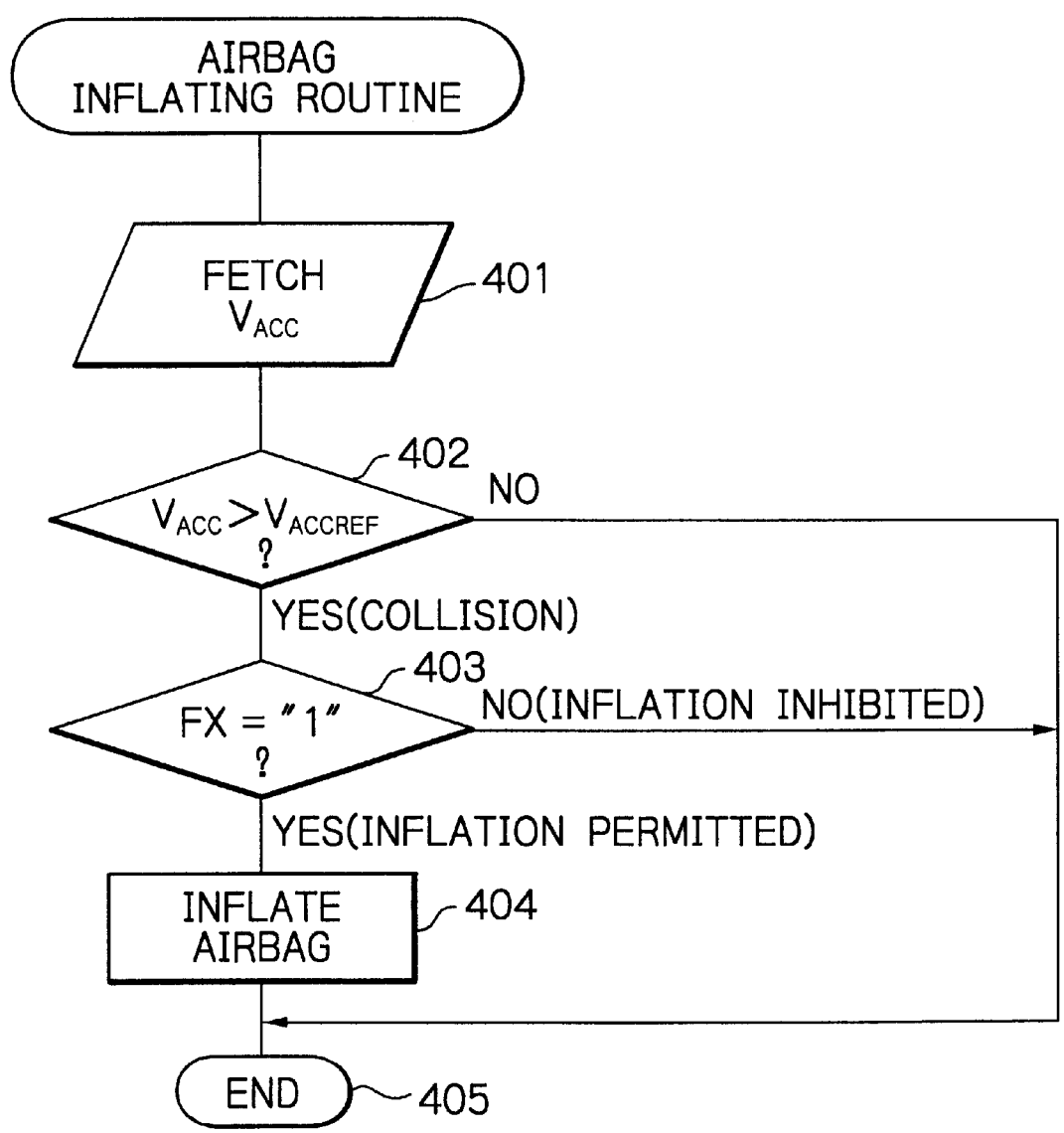
FIG. 4 is a flowchart showing the airbag inflating operation of the control units of FIG. 3.

The routine of FIG. 4 is completed by step 405.

An operation of calculating the airbag inflating permission flag FX of FIG. 4 is explained next with reference to a routine of FIG. 5 which is carried out at predetermined time intervals.

First, at step 501, the CPU 4-11 fetches the digital load voltage $V_{LOAD}$ from the A/D converter 4-1.

Next, at step 502, the CPU 4-11 fetches the digital output electric field voltage $V_{EF}$ (i) from the A/D converter 5-8 where i is 1 to 5. In this case, the digital output electric field voltage $V_{EF}$ (i) is obtained when the CPU 4-11 operates the selectors 4-6 and 4-7 so that the antenna electrode 3-$i$ is connected between the resistor 4-3 and the voltage buffer 4-4.

Next, at step 503, an average value $V_{EFAV1}$ is calculated by $$V_{EFAV1} \leftarrow (V_{EF}(1)+V_{EF}(2)+\ldots+V_{EF}(5))/5$$

Next, at step 504, the CPU 4-11 fetches the digital output electric field voltage $V_{EF}$ (i) from the A/D converter 5-8 where i is 6 to 10.

Next, at step 505, an average value $V_{EFAV2}$ is calculated by $$V_{EFAV2} \leftarrow (V_{EF}(6)+V_{EF}(7)+\ldots+V_{EF}(10))/5$$

Next, at step 506, the airbag inflating permission flag FX is calculated in accordance with the values $V_{LOAD}$, $V_{EFAV1}$, and $V_{EFAV2}$, using a table as shown in FIG. 6 which table is stored in the ROM 4-12. That is, it is determined whether $V_{LOAD}$ is higher than a reference value $V_{LOADREF1}$, and it is determined whether or not $V_{LOAD}$ is higher than $V_{LOAD2}$ ($<V_{LOAD1}$). As a result, there are three states of the voltage $V_{LOAD}$:

a high state ($V_{LOAD}>V_{LOADREF1}$);
 a medium state ($V_{LOAD2}<V_{LOAD}\leq V_{LOADREF1}$); and
 a low state ($0\leq V_{LOAD}\leq V_{LOAD2}$)

Also, it is determined whether or not $V_{EFAV1}$ is higher than a reference value $V_{EFAVREF1}$, and it is determined whether or not $V_{FAV1}$ is higher than a reference value $V_{EFAVREF2}$ ($<V_{FAVREF1}$). As a result, there are three states of the voltage $V_{EFAV1}$:

a high state ($V_{EFAV1}>V_{EFAVREF1}$);
 a medium state ($V_{EFAVREF2}<V_{EFAV1}\leq V_{EFAVREF1}$); and
 a low state ($0\leq V_{EFAV}\leq V_{EFAVREF2}$).

Further, it is determined whether or not $V_{EFAV1}$ is higher than the reference value $V_{EFAVREF1}$, and it is determined whether or not $V_{EFAV2}$ is higher than the reference value $V_{EFAVREF2}$. As a result, there are three states of the voltage $V_{EFAV2}$:

a high state ($V_{EFAV2}>V_{EFAVREF1}$);
 a medium state ($V_{EFAVREF2}<V_{EFAV2}\leq V_{EFAVREF1}$); and
 a low state ($0\leq V_{EFAV2}\leq V_{EFAVREF2}$)

Then, "0" or "1" is allocated to the airbag inflating permission flag FX in accordance with the table of FIG. 6.

Figure 7A:
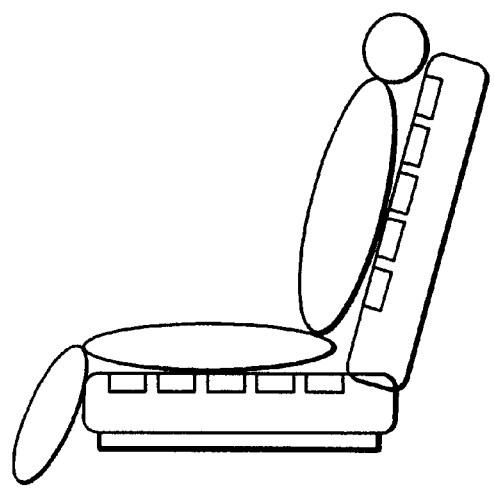
FIGS. 7A, 7B, 7C, 7D, 7E, 7F, 7G and 7H are diagrams showing objects seated on the seat of FIG. 2.

For example, as illustrated in FIG. 7A, when an adult is surely seated on the seat 1, the voltage $V_{LOAD}$ is high ($>V_{LOADREF1}$) and the voltage $V_{EFAV1}$ and $V_{EFAV2}$ are both high ($>V_{EFAVREF1}$), so that the airbag inflating permission flag FX is set (FX="1").

Figure 7B:
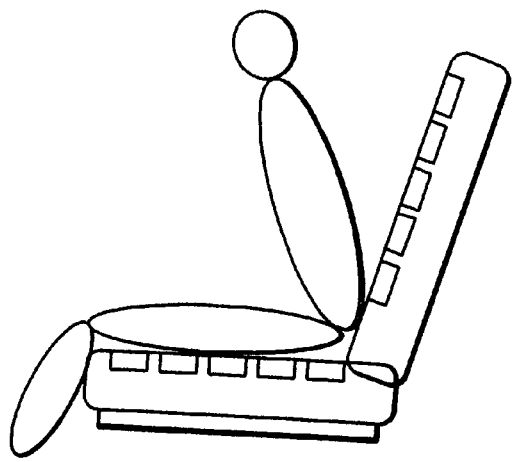

As illustrated in FIG. 7B, when an adult is seated and leaning forward on the seat 1, the voltage $V_{LOAD}$ is high ($>V_{LOADREF1}$), the voltage $V_{EFAV1}$ is high ($>V_{EFAVREF1}$), and the voltage $V_{EFAV2}$ is low ($\leq V_{EFAVREF2}$), so that the airbag inflating permission flag FX is set (FX="1").

Figure 7C:
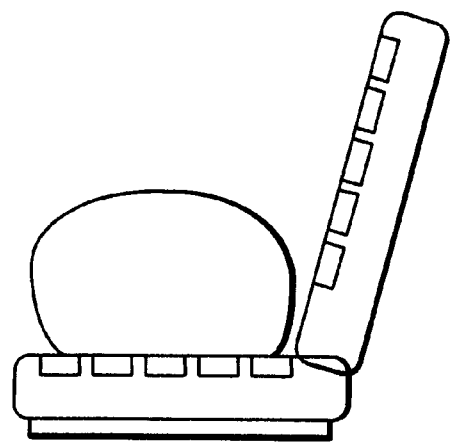

As illustrated in FIG. 7C, when a large luggage is seated on the seat 1, the voltage $V_{LOAD}$ is high ($>V_{LOADREF1}$), and the voltage $V_{EFAV1}$ and $V_{EFAV2}$ are both low ($\leq V_{EFAVREF2}$), so that the airbag inflating permission flag FX is reset (FX="0").

Figure 7D:
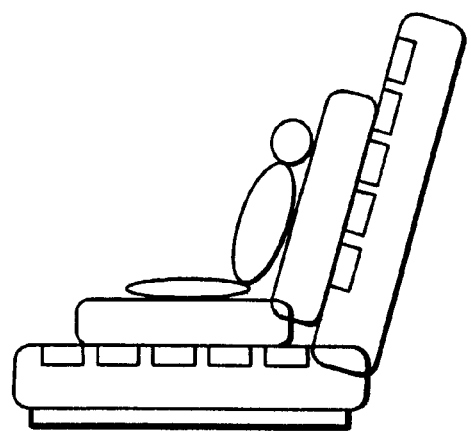

As illustrated in FIG. 7D, when an infant with an infant seat is seated in a forward facing manner on the seat 1, the voltage $V_{LOAD}$ is medium ($V_{LOADREF1}\sim V_{LOADREF2}$), the voltage $V_{EFAV1}$ is medium ($V_{EFAVREF1}\sim V_{EFAVREF2}$), and the voltage $V_{EFAV2}$ is high ($>V_{FAVREF1}$), so that the airbag inflating permission flag FX is set (FX="1").

Figure 7E:
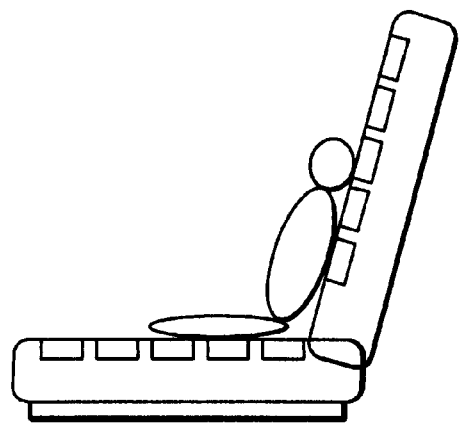

As illustrated in FIG. 7E, when a child is surely seated on the seat 1, the voltage $V_{LOAD}$ is medium ($V_{LOADREF1}\sim V_{LOADREF2}$) and the voltage $V_{EFAV1}$ and $V_{EFAV2}$ are both medium ($V_{EFAVREF1}\sim V_{EFAVREF2}$), so that the airbag inflating permission flag FX is reset (FX="0").

Figure 7F:
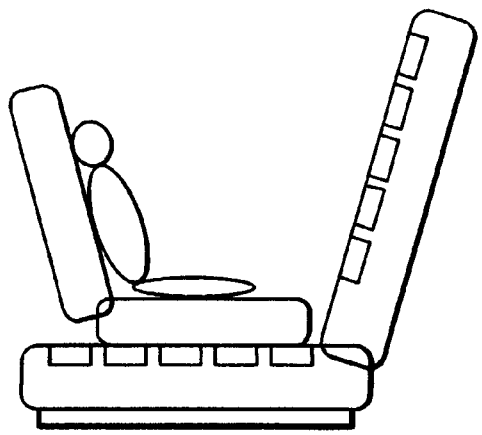

As illustrated in FIG. 7F, when an infant with an infant seat is seated in a backward facing manner on the seat 1, the voltage $V_{LOAD}$ is medium ($V_{LOADREF1}\sim V_{LOADREF2}$), the voltage $V_{EFAV1}$ is medium ($V_{EFAVREF1}\sim V_{EFAVREF2}$), and the voltage $V_{EFAV2}$ is low ($\leq V_{EFAVREF2}$), so that the airbag inflating permission flag FX is reset (FX="0").

Figure 7G:
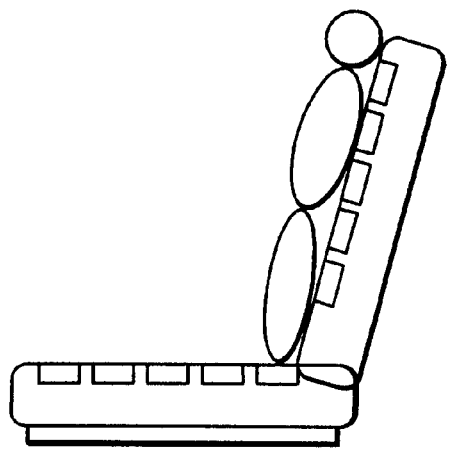

As illustrated in FIG. 7G, when a child is standing on the seat 1, the voltage $V_{LOAD}$ is medium ($V_{LOADREF1}\sim V_{LOADREF2}$), the voltage $V_{EFAV1}$ is low ($<V_{EFAVREF2}$), and the voltage $V_{EFAV2}$ is high($>V_{FAVREF1}$ so that the airbag inflating permission flag FX is reset (FX="1").

Figure 7H:
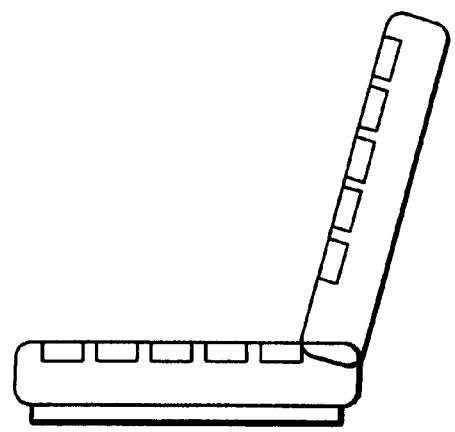

As illustrated in FIG. 7H, when no object is seated on the seat 1, the voltage $V_{LOAD}$ is low ($\leq V_{LOADREF2}$), so that the airbag inflating permission flag FX is reset (FX="0"), regardless of whether the seat 1 is dry or wet.

Figure 5:
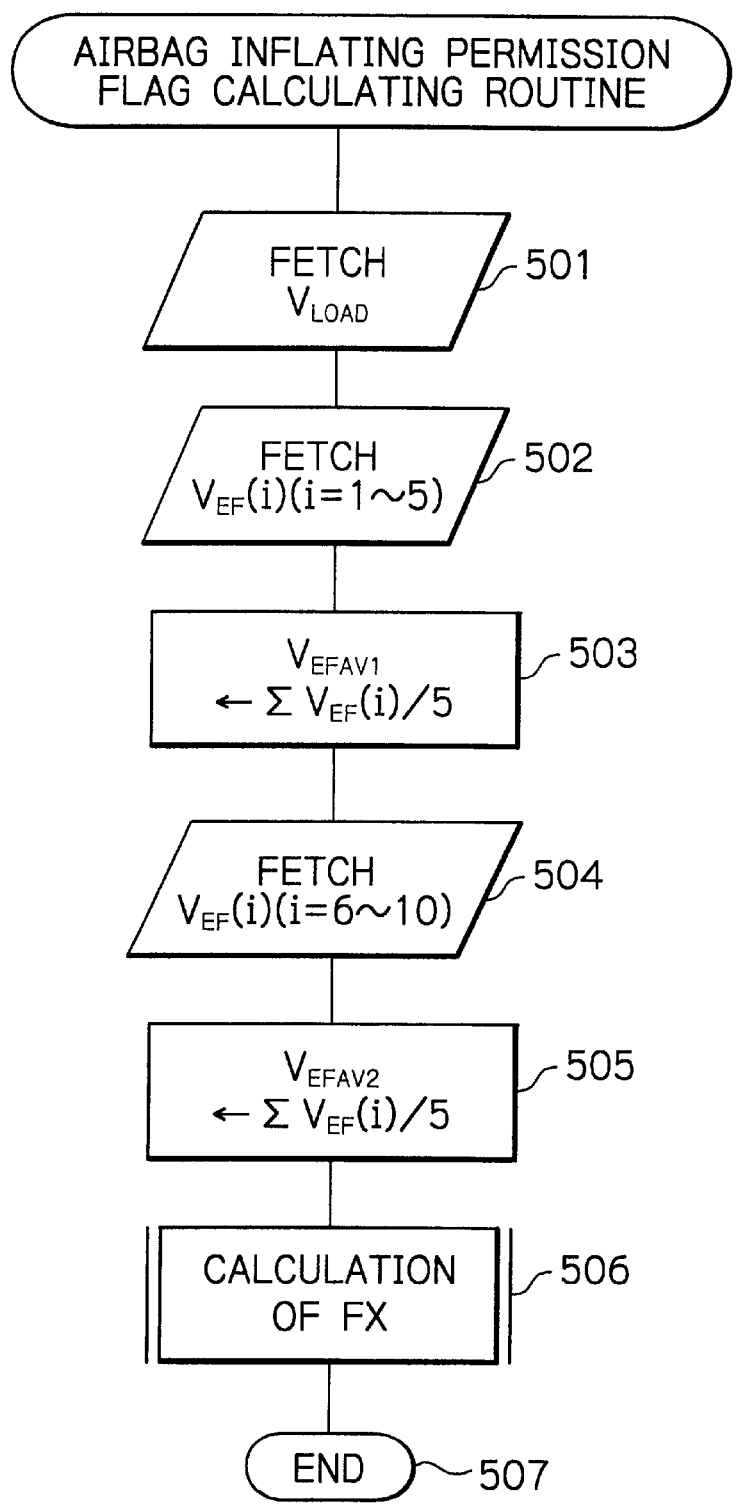
FIG. 5 is a flowchart for explaining the airbag inflating flag calculating operation of the control unit if FIG. 3.

Then, the routine of FIG. 5 is completed by step 507.

In the above-described first embodiment, a plurality of electric field sensors other than the five electric field sensors can be provided on the bottom part 11 of the seat 1, and also, a plurality of electric field sensors other than the five electric field sensors can be provided on the rear part 12 of the seat 1. Also, the reference values $V_{EFAVREF1}$ and $V_{EFAVREF2}$ can be different values for the average voltages $V_{EFAV1}$ and $V_{EFAV2}$.

In FIG. 8, which illustrates a second embodiment of the occupant detecting apparatus according to the present invention, only the antenna electrode 3-10 is provided in the rear part 12 of the seat 1. In this case, the antenna electrode 3-10 is used for determining whether or not an object seated on the seat 1 is higher than a predetermined value. Also, the load sensor 2 of FIG. 2 is not provided.

Figure 9:
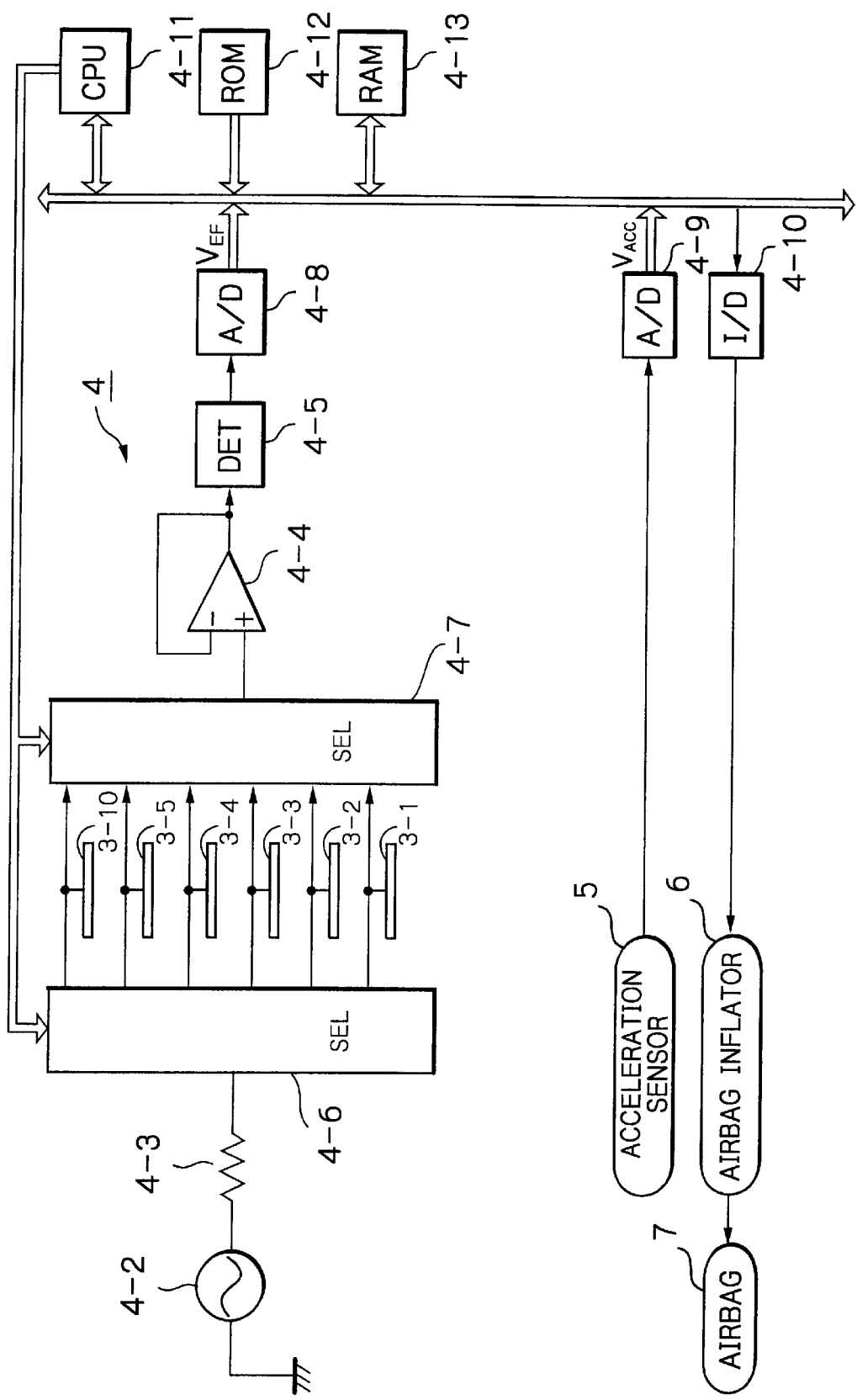
FIG. 9 is a block circuit diagram of the control unit of FIG. 8.

In FIG. 9, which is a block circuit diagram of the control unit 4 of FIG. 8, one of the antenna electrodes 3-1, 3-2, ..., 3-5 and 3-10 is selected by selectors 4-6 and 4-7 and is connected between the resistor 4-3 and the voltage buffer 4-4.

The airbag inflating operation of the control unit 4 (the CPU 4-11) of FIG. 9 is the same as that as in the flowchart of FIG. 4.

An operation of calculating the airbag inflating permission flag FX of FIG. 4 is explained next with reference to a routine of FIG. 10 which is carried out at pretermined time intervals.

First, at step 1001, the CPU 4-11 fetches the digital output electric field voltage $V_{EF}$ (i) from the A/D converter 5-8 where I is 1 to 5. In this case, the digital output electric field voltage $V_{EF}$ (i) is obtained when the CPU 5-11 operates the selectors 5-6 and 5-7 so that the antenna electrode 3-i is connected between the resistor 4-3 and the voltage buffer 4-4.

Next, at step 1002, an average value $V_{EFAV}$ is calculated by $$V_{EFAV} \leftarrow (V_{EF}(1)+V_{EF}(2)+\ldots+V_{EF}(5))/5$$

Next, at step 1003, the CPU 4-11 fetches the digital output electric field voltage $V_{EF}$ (10) from the A/D converter 5-8.

Next, at step 1004, the airbag inflating permission flag FX is calculated in accordance with the values $V_{LOAD}$, $V_{EFAV}$, and $V_{EF}(10)$, using a table as shown in FIG. 11 which table is stored in the ROM 4-12. That is, it is determined whether or not $V_{EFAV}$ is higher than a reference value $V_{EFAVREF1}$, and it is determined whether or not $V_{EFAV}$ is higher than a reference value $V_{EFAVREF2}$ ($<V_{EFAVREF1}$). As a result, there are three states of the voltage $V_{EFAV}$:

a high state ($V_{EFAV}>V_{EFAVREF1}$);
 a medium state ($V_{EFAVREF2}<V_{EFAV}\leq V_{EFAVREF1}$); and
 a low state ($0\leq V_{EFAV}\leq V_{EFAVREF2}$).

Further, it is determined whether or not $V_{EF}(10)$ is higher than the reference value $V_{EFREF}$. As a result, there are two states of the voltage $V_{EFAV2}$:

a high state ($V_{EF}(10) > V_{EFREF}$); and a low state ($0 \leq V_{EF}(10) \leq V_{EFREF}$).

Then, "0" or "1" is allocated to the airbag inflating permission flag FX in accordance with the table of FIG. 11.

Figure 12A:
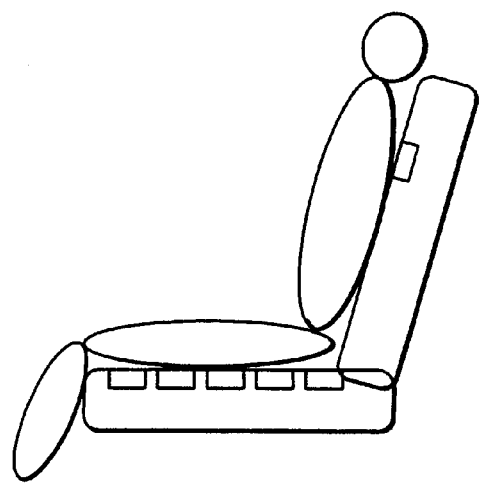
FIGS. 12A, 12B, 12C and 12D are diagrams showing objects seated on the seat of FIG. 8.

For example, as illustrated in FIG. 12A, when an adult is surely seated on the seat 1, the voltages $V_{EFAV}$ and $V_{EF}(10)$ are both high, so that the airbag inflating permission flag FX is set (FX="1").

Figure 12B:
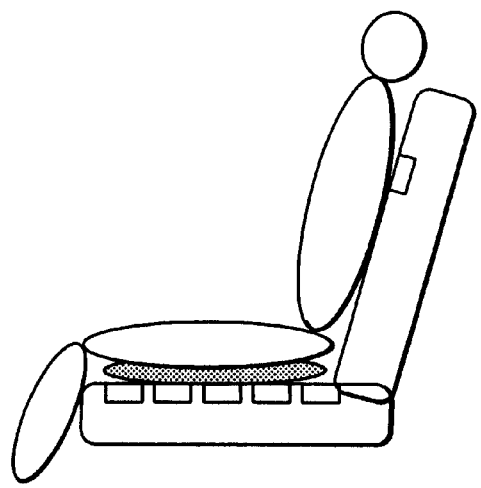

As illustrated in FIG. 12B, when a adult with a cushion is seated on the seat 1, the voltages $V_{EFAV}$ and $V_{EF}(10)$ are medium and high, respectively, so that the airbag inflating permission flag FX is set (FX="1").

Figure 12C:
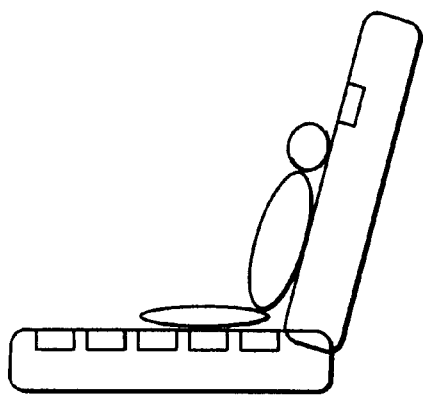

As illustrated in FIG. 12C, when a child is surely seated on the seat 1, the voltages $V_{EFAV}$ and $V_{EF}(10)$ are medium and low, respectively, so that the airbag inflating permission flag FX is reset (FX="0").

Figure 12D:
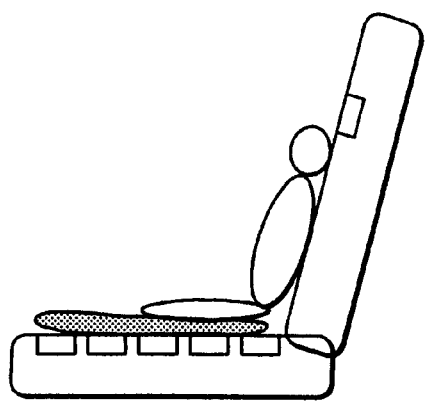

As illustrated in FIG. 12D, when a child with a cushion is seated on the seat 1, the voltage $V_{EFAV}$ and $V_{EF}(10)$ are both low, so that the airbag inflating permission flag FX is reset (FX="0").

Figure 10:
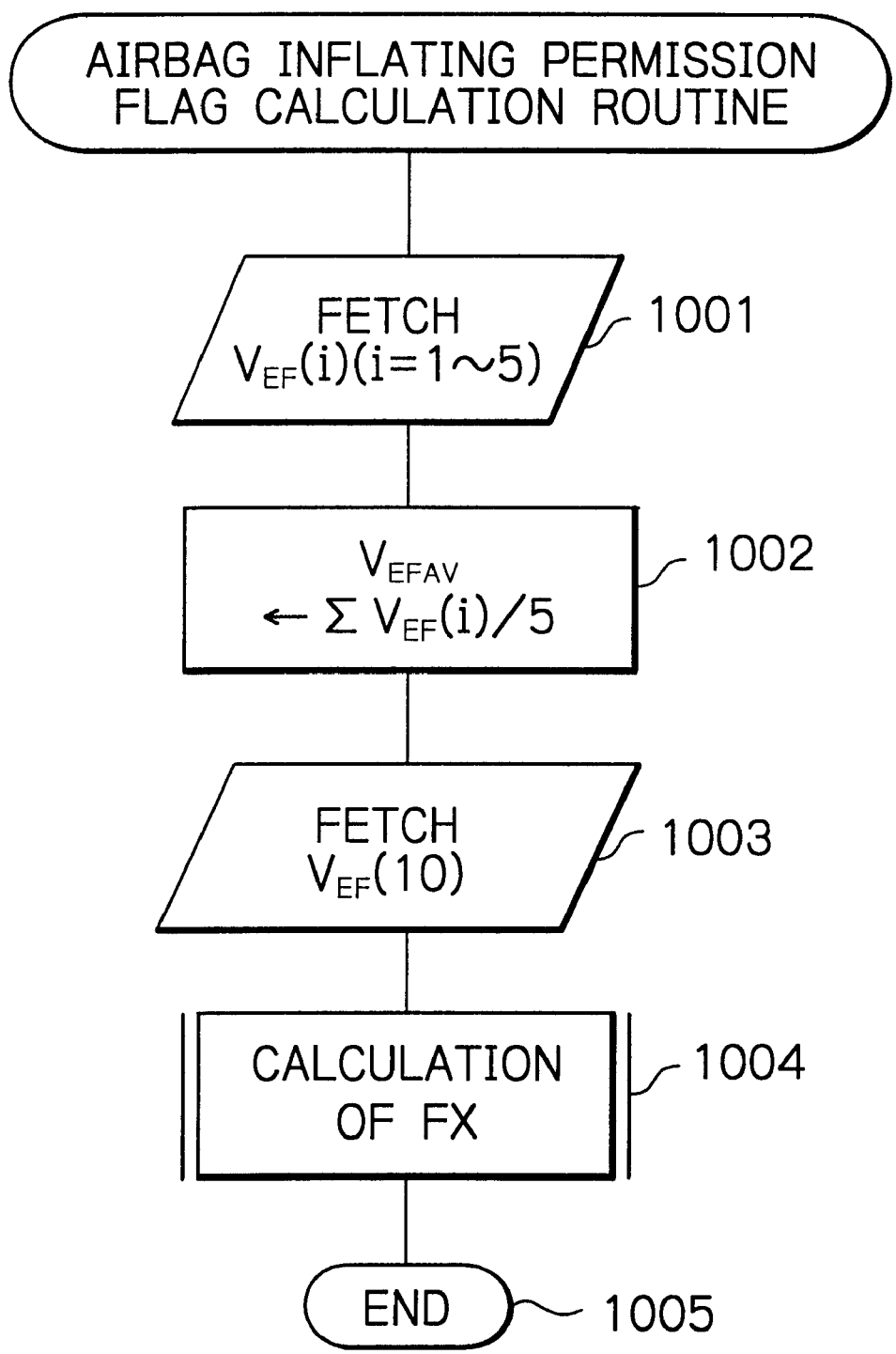
FIG. 10 is a flowchart for explaining the airbag inflating flag calculating operation of the control unit of FIG. 9.

Then, the routine of FIG. 10 is completed by step 1005.

In the above-described second embodiment, a plurality of electric field sensors other than the five electric field sensors can be provided on the bottom part 11 of the seat 1.

In FIG. 13, which illustrates a third embodiment of the occupant detecting apparatus according to the present invention, reference numeral 1 designates a front passenger seat formed by a bottom part 11 and a rear part 12.

A load sensor 2 formed by a strain gauge or a pressure sensor is provided between the bottom part 11 of the seat 1 and a vehicle floor (not shown), to measure the weight of an occupant seated on the seat 1.

An antenna electrode 3' for an electric field sensor is provided on the side of the rear part 12 of the seat 1.

The load sensor 2 and the antenna electrode 3' are connected by wire harness to a control unit 4 which also receives an output signal from a traverse acceleration sensor 5' to control a side-airbag inflator 6' for inflating a side-airbag 7'. That is, when the inflator 6' is driven by the control unit 4, pressurized hot gas is injected into the side-airbag 7', thus rapidly inflating the side-airbag 7'.

Note that the side-airbag 7' is located next to the antenna electrode 3'.

In FIG. 14, which is a block circuit diagram of the control unit 4 of FIG. 13, the selectors 406 and 407 of FIG. 3 are not provided, and therefore, the antenna electrodes 3' is always connected between the resistor 4-3 and the voltage buffer 4-4.

The side-airbag inflating operation of the control unit 4 (the CPU 4-11) of FIG. 14 is explained next with reference to a flowchart of FIG. 15 which is carried out at predetermined time intervals.

First, at step 1501, the CPU 4-11 fetches the digital output acceleration voltage $V_{ACC}'$ from the A/D converter 4-9.

Next, at step 1502, it is determined whether the digital output acceleration voltage $V_{ACC}'$ is higher than a reference vale $V_{ACCREF}$, i.e., whether or not a collision has occurred on the traverse side of the vehicle. Only when $V_{ACC}' > V_{ACCREF}'$, does the control proceed to step 1503. Otherwise, the control proceeds directly to step 1505.

At step 1503, it is determined whether a side-airbag inflating permission flag FX' is "1" or "0". Note that the setting and resetting of the inflation permission flag FX' will be explained later. Only when FX' is "1", does the control proceed to step 1504 which drives the side-airbag inflator 6', thus inflating the airbag 7'. Otherwise, the control proceeds directly to step 1505.

Figure 15:
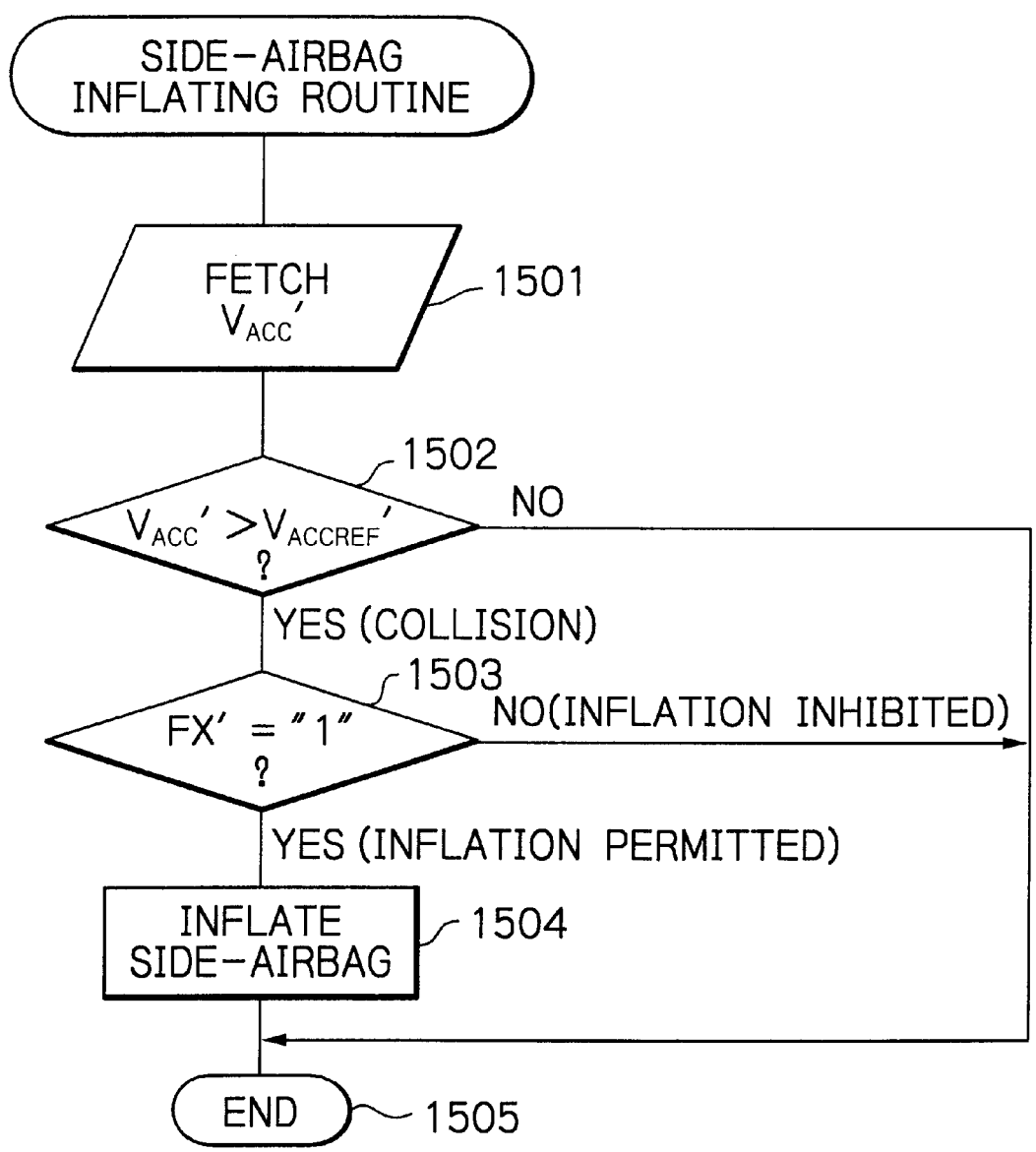
FIG. 15 is a flowchart showing the side-airbag inflating operation of the control units of FIG. 14.

The routine of FIG. 15 is completed by step 1505.

An operation of calculating the side-airbag inflating permission flag FX' of FIG. 15 is explained next with reference to a routine of FIG. 16 which is carried out at predetermined time intervals.

First, at step 1601, the CPU 4-11 fetches the digital load voltage $V_{LOAD}$ from the A/D converter 4-1.

Next, at step 1602, the CPU 4-11 fetches the digital output electric field voltage $V_{EF}$ from the A/D converter 4-8.

Next, at step 1603, the side-airbag inflating permission flag FX' is calculated in accordance with the values $V_{LOAD}$ and $V_{EF}$ using a table as shown in FIG. 17 which table is stored in the ROM 4-12. That is, it is determined whether $V_{LOAD}$ is higher than a reference value $V_{LOADREF1}$, and it is determined whether $V_{LOAD}$ is higher then $V_{LOADREF2}$ ($<V_{LOADREF1}$). As a result, there are three states of the voltage $V_{LOAD}$:

a high state ($V_{LOAD} > V_{LOADREF1}$)

a medium state ($V_{LOADREF2} < V_{LOAD} \leq V_{LOADREF}$; and a low state ($0 < V_{LOAD} \leq V_{LOADREF2}$)

Also, it is determined whether or not $V_{EF}$ is higher than a reference value $V_{EFREF}$, and it is determined whether or not $V_{EF}$ is higher than a reference value $V_{EFREF2}$ ($<V_{EFREF1}$). As a result, there are three states of the voltage $V_{EF}$:

a high state ($V_{EF} > V_{EFREF1}$);

a medium state ($V_{EFREF2} < V_{EF} \leq V_{EFREF1}$); and a low state ($0 \leq V_{EF} \leq V_{EFREF2}$).

Then, "0" or "1" is allocated to the side-airbag inflating permission flag FX' in accordance with the table of FIG. 17.

For example, when an adult is surely seated on the seat 1, the voltage $V_{LOAD}$ is high ($>V_{LOADREF}$), so that the side-airbag inflating permission flag FX' is set (FX="1") regardless of the voltage $V_{EF}$.

Figure 18A:
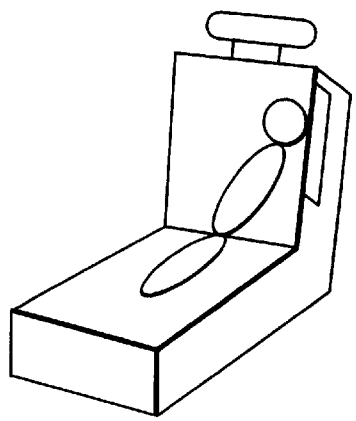
FIGS. 18A, 18B and 18C are diagrams showing objects seated on the seat of FIG. 13.

As illustrated in FIG. 18A, when a child is seated on the seat 1 and leans to the antenna electrode 3', the voltage $V_{LOAD}$ is medium ($V_{LOADREF1} \sim V_{LOADREF2}$)) and the voltages $V_{EF}$ is high ($>V_{EFREF1}$), so that the side-airbag inflating permission flag FX' is reset (FX'="0").

Figure 18B:
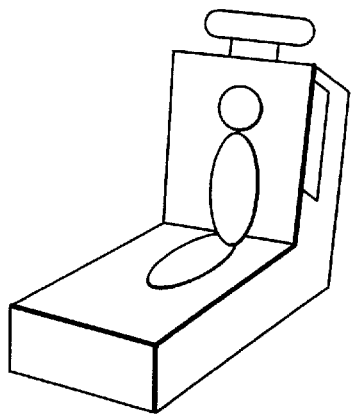

As illustrated in FIG. 18B, when a child is seated on the seat 1, the voltage $V_{LOAD}$ is medium ($V_{LOADREF1} \sim V_{LOADREF2}$) and the voltage $V_{EF}$ is medium ($V_{EFAVREF1} \sim V_{EFAVREF2}$), so that the side-airbag inflating permission flag FX' is set (FX "1").

Figure 18C:
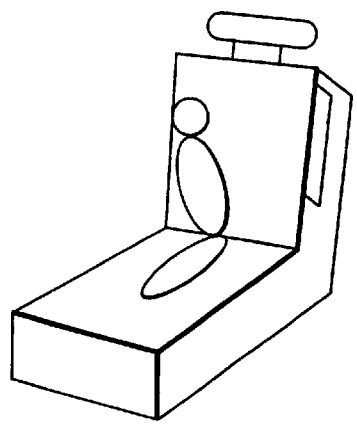

As illustrated in FIG. 18C, when a child is seated on the seat 1 and leans to the opposite side of the antenna electrode 3', the voltage $V_{LOAD}$ is medium ($V_{LOADREF1} \sim V_{LOADREF2}$) and the voltage $V_{EF}$ is low ($\leq V_{EFREF2}$), so that the side-airbag inflating permission flag FX' is set (FX'="1").

Figure 16:
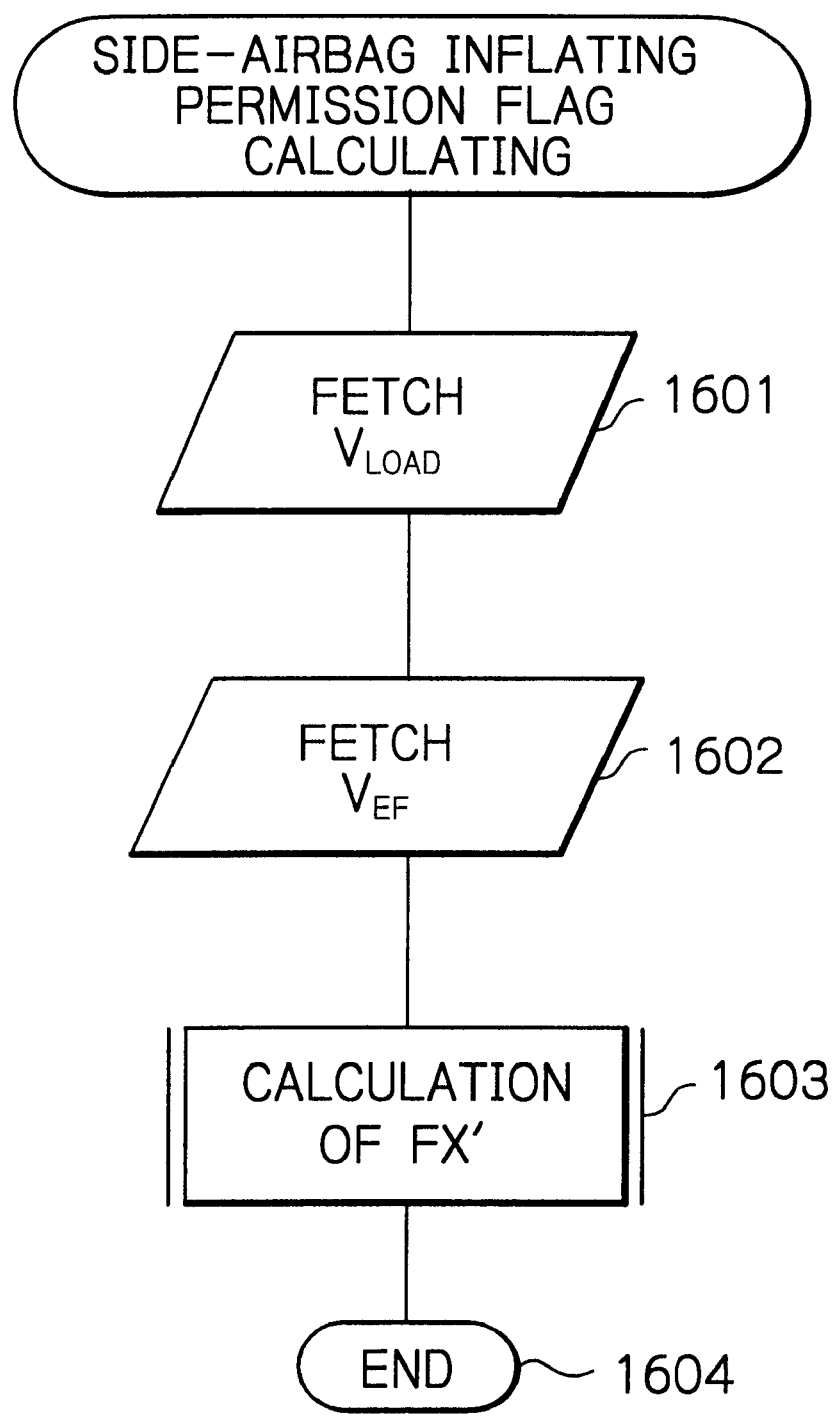
FIG. 16 is a flowchart for explaining the side-airbag inflating flag calculating operation of the control unit of FIG. 14.

Then, the routine of FIG. 16 is completed by step 1604.

Figure 19:
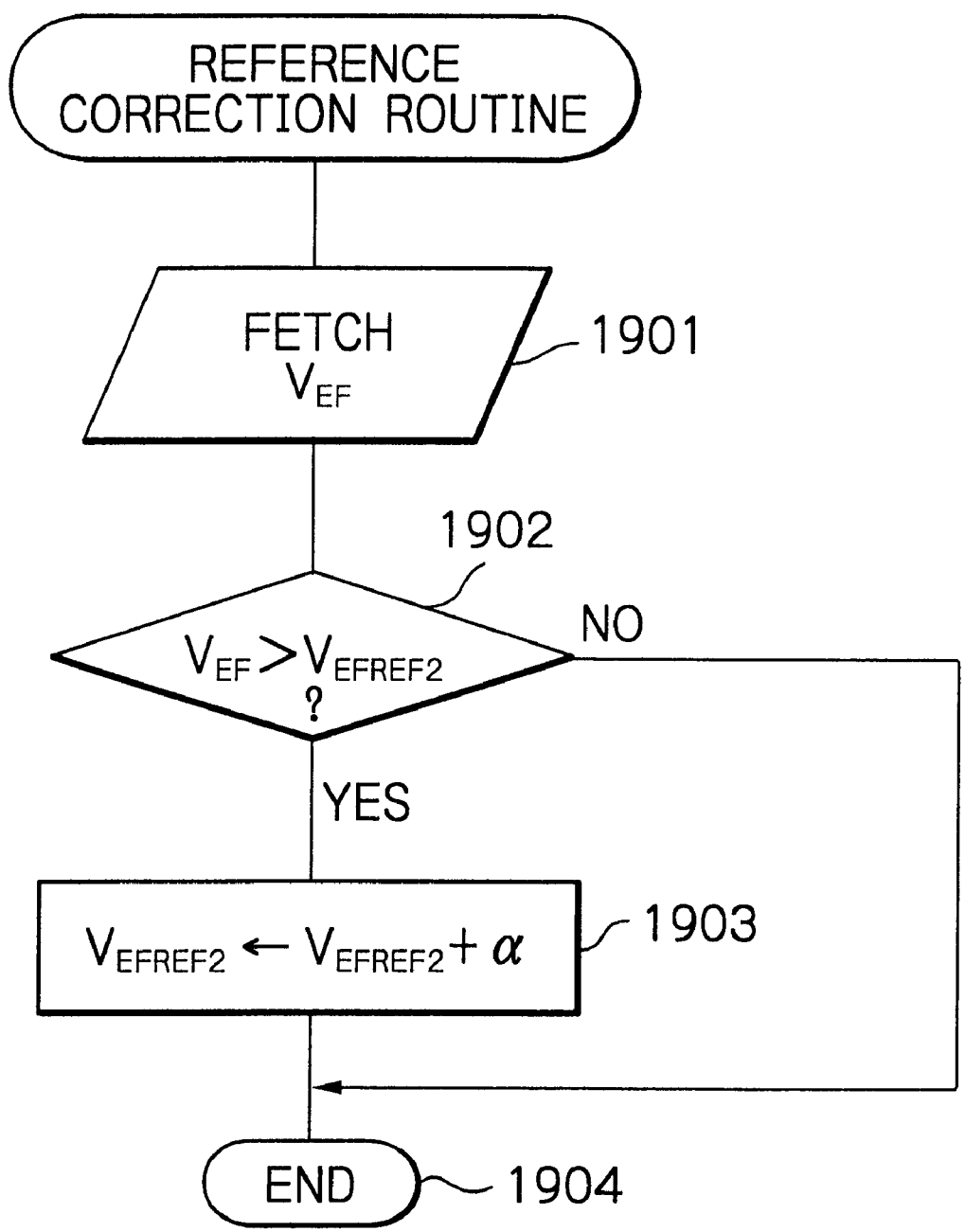
FIG. 19 is a flowchart for correcting the reference value in the flowcharts of FIGS. 4, 5, 10, 15 and 16.

In the above-mentioned embodiments, the reference values such $V_{LOADREF1}$, $V_{LOADREF2}$, $V_{EFAVREF1}$, $V_{EFAVREF1}$, $V_{EFREF1}$ and $V_{EFREF2}$ can be corrected as occasion demands. For example, when no object is seated in the seat 1, the driver initiates a flowchart as illustrated in FIG. 19 which corrects the reference value $V_{EFREF1}$ in the third embodiment. That is, at step 1901, the CPU 4-11 fetches the output voltage $V_{EF}$ from the A/D converter 4-8. Next, at step 1902, it is determined whether or not $V_{EF}$ is higher than the reference value $V_{EFREF2}$. In this case, $V_{EF} \leq V_{EFREF2}$ is expected. However, if $V_{EF} > V_{EFREF2}$, the control proceeds to step 1903 which increases $V_{EFREF2}$ by α. Then, the control is completed by step 1904. Other reference values such as $V_{LOADREF2}$ can be corrected by similar methods.

Figure 20:
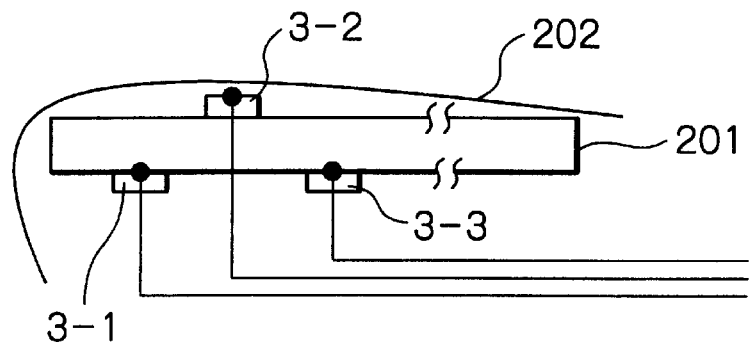
FIG. 20 is a diagram showing the arrangement of the antenna electrodes of FIGS. 2 and 8.

As illustrated in FIG. 20, the antenna electrodes 3-1, 3-2, ..., 3-5 of FIGS. 2 and 8 are provided on the front and back surfaces of a base cloth 201 covered by a seat cover 202 on the bottom part 11 of the seat 1. In this case, the antenna electrodes 3-1, 3-3 and 3-5 are adhered to the back surface of the base cloth 201, while the antenna electrodes 3-2 and 3-4 are adhered to the front surface of the base cloth 201, thus smoothing the seat cover 202. In this case, the wire harness of the antenna electrodes 3-2 and 3-4 penetrate the base cloth 201.

Figure 21A:
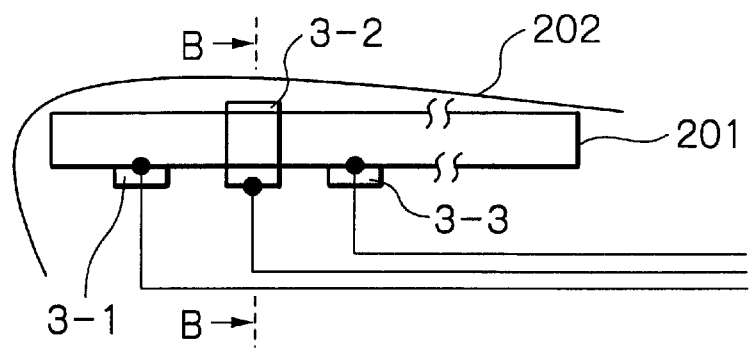
FIG. 21A is another diagram showing the arrangement of the antenna electrodes of FIGS. 2 and 8.
Figure 21B:
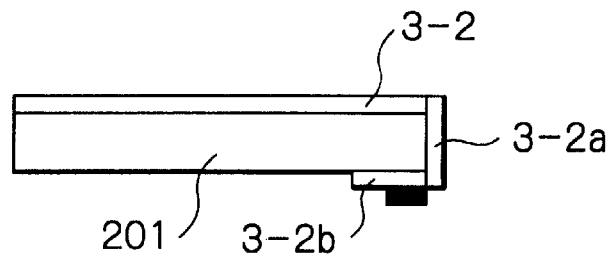
FIG. 21B is a cross-sectional view taken along the line B—B of FIG. 21A.

Also, the antenna electrodes 3-1, 3-2, . . . , 3-5 of FIGS. 2 and 8 can be provided as illustrted in FIG. 21A and FIG. 21B which is a cross-sectional view taken along the line B—B of FIG. 21A. That is, the antenna electrode 3-2 has an extension 3-2a on the side of the base cloth 201 and an extension 3-2b on the back surface of the base cloth 201. Also, the antenna electrode 3-4 has the same configuration as the antenna electrode 3-2. As a result, the part of the wire harness through the base cloth 201 of FIG. 20 is unnecessary, which further smooths the seat cover 202. In addition, the reliability of the electric field sensors can be improved as compared with those of FIG. 20.

In the above-described first and second embodiments, although the averge value of the output signals of the electric field sensors is calculated, the permission flag can be calculated in accordance with the pattern of the output signals of the electric field sensors.

Also, the present invention can be applied to a rear passenger seat.

As explained hereinabove, according to the present invention, since a plurality of electric field sensors are provided in a passenger seat and the presence or absence of an occupant in the seat is determined in accordance with a logic processing of the output signals of the electric field sensors, the detection accuracy of an occupant in the seat can be improved.

Also, the presence or absence of an occupant in the seat is determined in accordance with the combination of an output signal of a load sensor provided in the seat with the output signals of the electric field sensors, the detection accuracy of an occupant can be further improved.

What is claimed is:

1. An occupant detecting apparatus for detecting an occupant seated on a passenger seat of a vehicle with an airbag for said occupant, comprising:
    a load sensor provided in a bottom part of said seat;
    a plurality of first electric field sensors provided in the bottom part of said seat;
    a plurality of second electric field sensors provided in a rear part of said seat; and
    an airbag inflating permission control unit, connected to said load sensor and said first and second electric field sensors, for permitting inflation of said airbag in accordance with output signals of said load sensor and said first and second electric field sensors,
    wherein said airbag inflating permission control unit compares an output signal of said load sensor with first and second load reference values, compares an average value of output signals of said first electric field sensors with first and second electric field reference values, and compares an average value of output signals of said second electric field sensors with third and fourth electric field reference values,
    said first load reference value being higher than said second load reference value,
    said first electric field reference value being higher than said second electric field reference value,
    said third electric field reference value being higher than said fourth electric field reference value.

2. The apparatus as set forth in claim 1, wherein when the output signal of said load signal is higher than said first load reference value, an average value of the output signals of said first electric field sensors is higher than said first electric field reference value and an average value of the output signals of said second electric field sensors is higher than said third electric field reference value, said airbag inflating permission control unit determines that an adult is surely seated on said seat to permit the inflation of said airbag.

3. The apparatus as set forth in claim 1, wherein when the output signal of said load signal is higher than said first load reference value, an average value of the output signals of said first electric field sensors is higher than said first electric field reference value and an average value of the output signals of said second electric field sensors is lower than said fourth electric field reference value, said airbag inflating permission control unit determines that a bowed adult is seated on said seat to permit the inflation of said airbag.

4. The apparatus as set forth in claim 1, wherein when the output signal of said load signal is higher than said first load reference value, an average value of the output signals of said first electric field sensors is lower than said second electric field reference value and an average value of the output signals of said second electric field sensors is lower than said fourth electric field reference value, said airbag inflating permission control unit determines that a large luggage is seated on said seat not to permit the inflation of said airbag.

5. The apparatus as set forth in claim, 1 wherein when the output signal of said load signal is between said first and second load reference values, an average value of the output signals of said first electric field sensors is between said first and second electric field reference values and an average value of the output signals of said second electric field sensors is higher than said third electric field reference value, said airbag inflating permission control unit determines that an infant with an infant seat is seated in a forward facing manner on said seat to permit the inflation of said airbag.

6. The apparatus as set forth in claim 1, wherein when the output signal of said load signal is between said first and second load reference values, an average value of the output signals of said first electric field sensors is between said first and second electric field reference values and an average value of the output signals of said second electric field sensors is between said third and fourth electric field reference values, said airbag inflating permission control unit determines that a child is surely seated on said seat not to permit the inflation of said airbag.

7. The apparatus as set forth in claim 1, wherein when the output signal of said load signal is between said first and second load reference values, an average value of the output signals of said first electric field sensors is between said first and second electric field reference value and an average value of the output signals of said second electric field sensors is lower than said fourth electric field reference value, said airbag inflating permission control unit determines that an infant with an infant seat is seated in a backward facing manner on said seat not to permit the inflation of said airbag.

8. The apparatus as set forth in claim 1, wherein when the output signal of said load signal is between said first and second load reference value, an average value of the output signals of said first electric field sensors is lower than said second electric field reference value and an average value of the output signals of said second electric field sensors is higher than said third electric field reference value, said airbag inflating permission control unit determines that a child is standing on said seat to permit the inflation of said airbag.

9. The apparatus as set forth in claim 1, wherein when the output signal of said load signal is lower than said second load reference value, said airbag inflating permission control unit determines that no occupant is seated on said seat not to permit the inflation of said airbag, regardless of whether said seat is wet or dry.

10. The apparatus as set forth in claim 1, wherein said airbag inflating permission control unit corrects said second load reference value and said second and fourth reference values when no object is seated on said seat.

11. An occupant detecting apparatus for detecting an occupant seated on a passenger seat of a vehicle with an airbag for said occupant, comprising:

a load sensor provided in a bottom part of said seat;

a plurality of first electric field sensors provided in the bottom part of said seat;

a plurality of second electric field sensors provided in a rear part of said seat; and an airbag inflating permission control unit, connected to said load sensor and said first and second electric field sensors, for permitting inflation of said airbag in accordance with output signals of said load sensor and said first and second electric field sensors, wherein antenna electrodes of said first and second electric field sensors are alternately arranged on front and back surfaces, respectively, of a base cloth, each of said antenna electrodes on the front surface of said base cloth having a first extension on a side of said base cloth and a second extension on the back surface of said base cloth.

12. An occupant detecting apparatus for detecting an occupant seated on a passenger seat of a vehicle with an airbag for said occupant, comprising:

a plurality of first electric field sensors provided in the bottom part of said seat;

a second electric field sensor provided in a rear part of said seat; and an airbag inflating permission control unit, connected to said first and second electric field sensors, for permitting inflation of said airbag in accordance with output signals of said first and second electric field sensors, wherein said airbag inflating permission control unit compares an average value of output signals of said first electric field sensors with first and second reference values, and compares an output signal of said second electric field sensor with a third reference value, said first reference value being higher than said second reference value.

13. The apparatus as set forth in claim 12, wherein when an average value of the output signals of said first electric field sensors is higher than said first reference value and the output signal of said second electric field sensor is higher than said third reference value, said airbag inflating permission control unit determines that an adult is surely seated on said to permit the inflation of said airbag.

14. The apparatus as set forth in claim 12, wherein when an average value of the output signals of said first electric field sensors is between said first and second reference values and the output signal of said second electric field sensor is higher than said third reference value, said airbag inflating permission control unit determines that an adult with a cushion is surely seated on said seat to permit the inflation of said airbag.

15. The apparatus as set forth in claim 12, wherein when an average value of the output signals of said first electric field sensors is between said first and second reference values and the output signal of said second electric field sensor is lower than said third reference value, said airbag inflating permission control unit determines that a child is surely seated on said seat not to permit the inflation of said airbag.

16. The apparatus as set forth in claim 12, wherein when an average value of the output signals of said first electric field sensors is lower than said second reference value and the output signal of said second electric field sensor is lower than said third reference value, said airbag inflating permission control unit determines that a child with a cushion is surely seated on said seat not to permit the inflation of said airbag.

17. The apparatus as set forth in claim 12, wherein said airbag inflating permission control unit corrects said second and third reference values when no object is seated on said seat.

18. An occupant detecting apparatus for detecting an occupant seated on a passenger seat of a vehicle with an airbag for said occupant, comprising:

a load sensor provided in a bottom part of said seat;

a plurality of first electric field sensors provided in the bottom part of said seat;

a plurality of second electric field sensors provided in a rear part of said seat; and an airbag inflating permission control unit, connected to said load sensor and said first and second electric field sensors, for permitting inflation of said airbag in accordance with output signals of said load sensor and said first and second electric field sensors, wherein antenna electrodes of said first electric field sensors are alternately arranged on front and back surfaces, respectively, of a base cloth, each of said antenna electrodes on the front surface of said base cloth having a first extension on a side of said base cloth and a second extension on the back surface of said base cloth.

* * * * *